United States Patent [19]

Kawabata et al.

[11] Patent Number: 5,173,202
[45] Date of Patent: Dec. 22, 1992

[54] LUBRICANT COATING MATERIAL: ITS CHARACTERISTICS AND METHOD OF MANUFACTURE

[75] Inventors: Kodo Kawabata; Tetunosuke Oharu, both of Tokyo; Mikio Naisei, Aizu-Wakamatsu, all of Japan

[73] Assignee: Kabushiki Kaisha Kawabata Seisakusho, Tokyo, Japan

[21] Appl. No.: 633,613

[22] Filed: Dec. 24, 1990

Related U.S. Application Data

[63] Continuation of Ser. No. 933,038, Nov. 20, 1986, abandoned.

[30] Foreign Application Priority Data

Dec. 27, 1985 [JP] Japan .................. 60-266925

[51] Int. Cl.$^5$ ................. C10M 125/10; C10M 125/00
[52] U.S. Cl. ..................................... 252/12.2; 252/12; 252/25
[58] Field of Search ............. 252/25, 12, 12.2

[56] References Cited

U.S. PATENT DOCUMENTS

| | | | |
|---|---|---|---|
| B 380,137 | 3/1976 | Seino et al. | 252/12.2 |
| 3,003,890 | 10/1961 | Dean | 252/25 |
| 3,300,667 | 1/1967 | Boes et al. | 252/25 |
| 3,711,171 | 1/1973 | Orkin et al. | 252/25 |
| 4,094,893 | 6/1978 | Dines | 252/25 |
| 4,145,297 | 3/1979 | Gatti et al. | 252/25 |
| 4,193,769 | 3/1980 | Cheng et al. | 252/25 |
| 4,228,670 | 10/1980 | Corti et al. | 252/25 |
| 4,293,429 | 10/1981 | Cheng et al. | 252/25 |
| 4,411,804 | 10/1983 | DeVries et al. | 252/25 |
| 4,486,319 | 12/1984 | Jamison | 252/12.2 |
| 4,575,430 | 3/1986 | Periard et al. | 252/12.2 |
| 4,655,944 | 4/1987 | Mori | 252/12.2 |
| 4,666,787 | 5/1987 | Bickle et al. | 252/12.2 |

FOREIGN PATENT DOCUMENTS 127281 7/1985 Japan .................. 252/12.2

*Primary Examiner*—Ellen McAvoy
*Attorney, Agent, or Firm*—Price, Heneveld, Cooper, Dewitt & Litton

[57] ABSTRACT

Lubricant coating material and its manufacturing method that provide ceramic particulates which are almost spheroidal and fairly hard, or mixture of such particulates and lube oil, as lubricant coating material.

This material can be supplied to rotating or rubbing parts of machinery, automobiles and ships. It embeds into metal surface of the parts and forms a thin coating. Thus, it creates ultra-smooth surfaces and reduces friction.

6 Claims, 1 Drawing Sheet or more; their Vickers hardness is from 300 to 1500 Hv.

LUBRICANT COATING MATERIAL: ITS CHARACTERISTICS AND METHOD OF MANUFACTURE

This is a continuation of application Ser. No. 06/933,038, filed Nov. 20, 1986, now abandoned.

BACKGROUND

General Information

This invention consists of a new kind of lubricant coating material and the method for manufacturing it. It has applications in lubricating friction-producing parts of machines, automobiles, motorcycles, ships, etc.

Conventional Lubrication Techniques

Up until now, lubricants used for parts of machinery which rub or rotate have consisted of lubricating oil in combination with various pulverized compounds, whether metallic (molybdenum disulfide), ceramic (graphite, boron nitride), or organic (Teflon and various auxiliaries). Such powders are added to the lubricating oil after being made oil soluble. Generally, these compounds are made of soft materials and are heat resistant. But the rotating or sliding parts of machines, automobiles, ships and others, using such lubricants are apt to wear and heat up because of the strong forces exerted on them. Because of this, the lubricating oil or lubricant is likely to deteriorate with the passage of time and lose its effectiveness. Crystals of Teflon, molybdenum disulfide, graphite, and boron nitride have layered structures and are particularly vulnerable to shearing. Although these materials bond well to the metal surfaces they are used to lubricate, constant rubbing and friction tend to change the shape and structure of their particles. They are also oxidized by oxygen in the air, and their lubrication effectiveness is deteriorated.

In addition, there are problems with conventional methods of producing such lubricants. First, it is hard to produce pulverized materials with homogenous shape and grain, because the materials used are so soft. Even for particulate matter, the grain size is usually not homogenous. In part this is unavoidable, since lubricating action occurs when they are pulverized.

A second problem with the usual methods for producing lubricants is that the process used to pulverize lubricating powders often contaminates the final product. Air pulverization will not work on materials that are too light for this method, and when the wet-type rotation pulverizer, which uses steel or glass as a grinding medium, is used, the pulverizer and the pulverizing media are abraded and are mixed with the materials to be pulverized. It is often extremely difficult to separate such impurities from the finished product, and the metal powders or oxides contained in these impurities often change the characteristics of the lubricant being produced and cause its quality to deteriorate.

Generally, the desired qualities of a lubricant are as follows:

1) It must be resistant to solvents, heat, abrasion, pressure, oxidation, etc.; in short, it must not be prone to either physical or chemical deterioration or denaturing.

2) It must abrade as little as possible the working parts it is used to lubricate.

3) It must reduce the abrasion and friction caused by the rotating or rubbing motions of the working parts.

It is difficult to find existing materials that fulfill all of these requirements. For example, some materials can only be produced under controlled atmospheric conditions. Boron nitride is pulverized under gaseous nitrogen, then mixed with lubricating oil; but even dissolved in the oil, some of the compound inevitably deteriorates due to contact with oxygen in the air and loses some of its effectiveness as a lubricant.

This invention is meant to avoid all the problems conventional lubricants are prone to, and to meet all of the above requirements. The aim here is to create a lubricant coating material (and a method for manufacturing it) which will reduce the friction and resistance produced by contacting parts; which will be resistant to solvents, heat, abrasion, pressure, and oxidation; and which will resist physical or chemical degradation.

DETAILS OF THE INVENTION

Summary

The invention consists of a lubricant coating material made of ceramic particles mixed with lubricating oil. The ceramic particles are round with a particle diameter of 0.5 micron or less; their melting point is 1800° C. or more; their Vickers hardness is from 300 to 1500 Hv.

The method of manufacture is as follows: the particles whose specifications are set out in the preceding paragraph are put into the ceramic vessel of a pulverizer with a Vickers hardness of at least 1500 Hv. A ceramic pulverizing medium with a Vickers hardness of at least 1500 Hv is used to pulverize the material into round particles with a diameter of 0.5 micro meter or less. The particles are then mixed with lubricating oil.

Lubricant's Utility in Practical Applications

The import of this invention can be better understood if we turn our attention to FIGS. 1 and 2.

Figure 1:
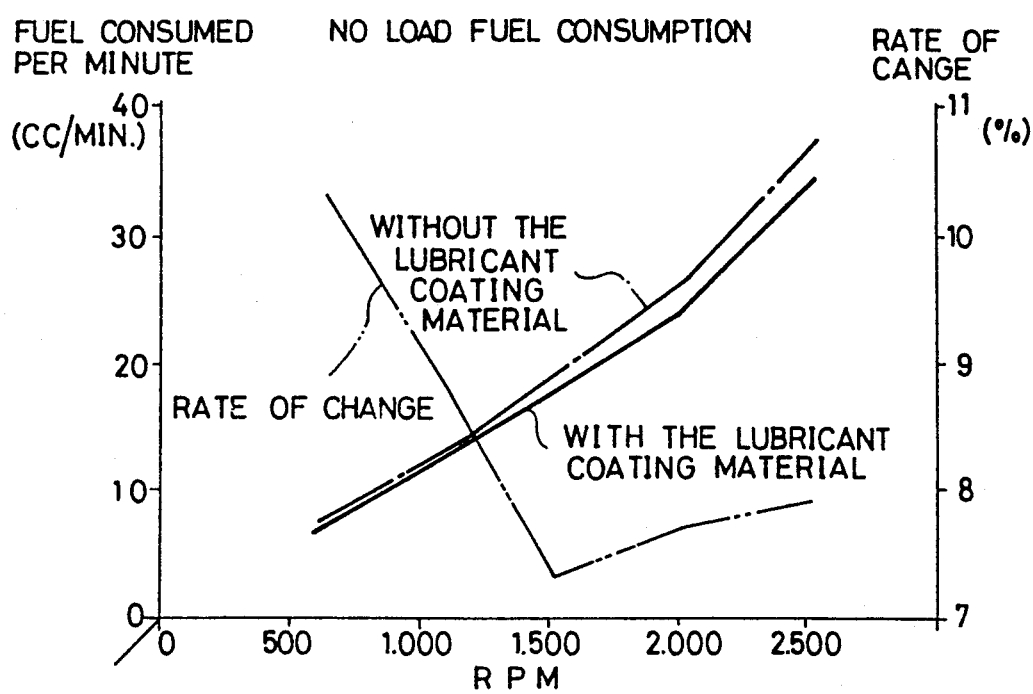
FIG. 1 shows the results of a test comparing no-load fuel consumption of small-sized passenger cars using this lubricant coating material, with that for similar cars using conventional lubricants.

In order to understand how this lubricant works when it is used on the contacting parts of machines or automobiles, it is important to remember that even surfaces that seem to be perfectly smooth to the naked eye retain a few microns of roughness or unevenness, despite the most minute polishing. When the lubricant coating material is applied to working machine surfaces, it fills in the hollow parts of the uneven surface and forms a smooth surface, eliminating the microscopic projections on the contact surface and reducing resistance. In addition, the particles of the coating material under discussion bond deeply or permanently to the metal surface on which they are used, so that they stay in place even when these metal surfaces are deformed or heated. This is why we call the invention a "lubricant coating material" rather than merely a lubricant: it creates a thin layer on top of the metal surface which cannot be removed by instruments, peeled, or abraded. In short, use of this lubricant material creates an extremely smooth and durable surface, permitting contact area to be maximized and friction to be minimized.

Method of Manufacturing

In order to form the spheroidal particles with the above specifications, ceramic powder is placed in the ceramic vessel of a wet sand mill, where it is pulverized by very hard (Vickers hardness excess of 1500 Hv) grinding media, such as ceramic beads. Once pulverized, the particles are of a uniform size, with a grain diameter of 0.5 micron or less (the average is 0.1 micron). An advantage of this method is that the polishing capacity of very small (less than 0.5 micron) particles is reduced, especially when spheroidal particles are used, so that the lubricating coating material will tend not to abrade even easy to polish surfaces. The ceramic particles are mixed with an ordinary lube oil, though they could be used with other lubricating liquids as well. In order to keep its abrasion hardness lower than that of the metals it is used on, the ceramics selected generally have a Vickers hardness of at most 850 Hv; on the other end of the spectrum, they must have a hardness of at least 300 Hv in order to keep the particles from disintegrating or abrading under the stress of friction, pressure and heat. One example of a ceramic material which meets these specifications is zirconium oxide.

Generally the maximum temperature in the combustion chamber of an engine ranges from 1000° to 2000° C. Most existing lubricants are not able to resist such heat, unlike the lubricant coating material which can withstand such temperatures. The lubricant coating material forms ultra smooth surfaces by coating microscopic uneven surfaces and reduces heat generation, thus producing the same effects with those of lube oils, etc. In addition, in the case of lube oil mixed or dispersed with the coating material, even when the oil volume is reduced, the lubrication effect can be maintained.

TESTING AND PERFORMANCE RESULTS

In the following section, the methods and results of various tests done using the lubricant coating material we developed are explained.

Method for Preparing Lubricant Coating Material

Put zirconium oxide particles of about 4 micron diameter in the container of a wet-type rotation pulverizer. Grind for 15 minutes, with a density of solid material to water of 50% (other liquids can also be used in the wet process grinding with no difference in result). Particulates are obtained with an average grain diameter of 0.1 micron as measured through an electron microscope.

Add 60 g of the particulates so obtained to 300 g of automobile engine oil; mix and disperse through the oil in the dispersion machine to make 360 g of lubricant coating material.

In order to compare the effectiveness of the lubricant coating material to conventional lubricants, we mixed the four following sample materials into automobile engine oil:

A—Commercial Teflon lubricant
B—Commercial boron nitride lubricant
C—Commercial molybdenum disulfide lubricant
D—Developed lubricant coating material (prepared in the above described manner)

Several tests were conducted on automobile engines using these sample materials. The results are summarized below.

a) Rotation and Acceleration at Low Speed (Method) Add 25 cc of sample material, containing 25% solids by weight, per liter of commercial engine oil. Pour the mixture up to the standard level specified for the engine. Drive the test car with manual transmission 500 km on the road.

(Results) In comparison with the other test materials, engine rotation at low speed is relatively stable when lubricant coating material (D) is used. Using the lubricant coating material, acceleration at low speed with the transmission in top gear is possible, and easier than with the other sample lubricants.

A. Teflon lubricant
  Acceleration possible at 30 kmh or faster.
B. Boron nitride lubricant
  Acceleration possible at 30 kmh or faster.
C. Molybdenum disulfide lubricant
  Acceleration possible at 33 kmh or faster.
D. Lubricant coating material
  Acceleration possible at 25 kmh or faster.

b. Improvement of Maximum Engine Speed (Method) The test was conducted on engines working at a maximum engine speed of 6,300 rpm before adding the sample materials.

(Results)
A. Teflon lubricant: 6,800 rpm
B. Boron nitride lubricant: 6,800 rpm
C. Molybdenum disulfide lubricant: 6,600 rpm
D. Lubricant coating material: 7,300 rpm c. Reduction of Fuel Consumption (Results)

When the engines were operated at 2,500 rpm, there was no significant difference between the sample lubricants; fuel consumption was reduced about 2% for all the engines tested.

When the engines were operated at 4,500 rpm, fuel consumption was reduced by the following percentages over performance without using motor oil additives:
A. Teflon lubricant: down 4.5%
B. Boron nitride lubricant: down 4.0%
C. Molybdenum disulfide lubricant: down 3.0%
D. Lubricant coating material: down 7.0% d. Duration of Lubricant Effect (Results)
A. Teflon lubricant: approx. 2,000 km driving
B. Boron nitride lubricant: approx. 2,000 km driving
C. Molybdenum disulfide lubricant: approx 2,500 km driving
D. Lubricant coating material: more than 20,000 km driving e. Fuel Consumption for Freight Trucks (Method) 400 g of the coating material was added to 36 l of lubricant used for test trucks A and B. Nothing was added to the lubricant for test trucks C and D.

(Results)—shown in the following table f. No-load Fuel Consumption (results shown in FIG. 1)

Figure 2:
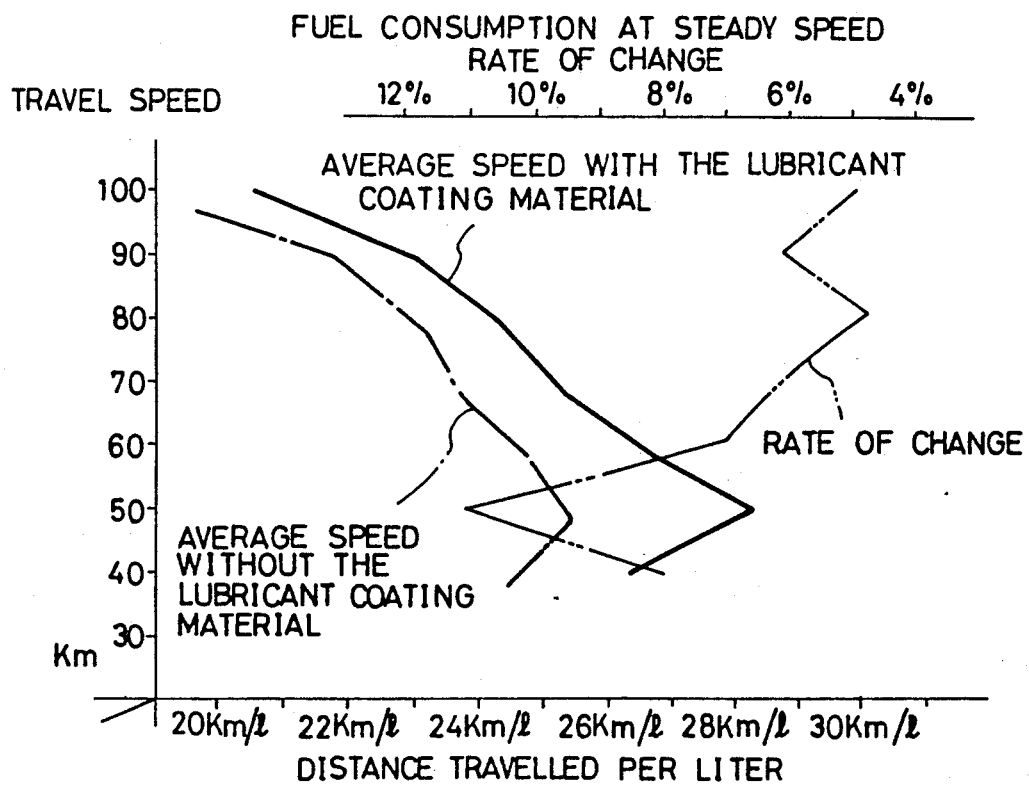
FIG. 2 shows the results of a similar fuel consumption comparison test at steady speed conditions. Clearly, cars using the lubricant coating material perform better than those using conventional lubricants.

Test used compact passenger cars with diesel engines. Graph indicates that the lubricant coating material reduces fuel consumption.

g. Steady Speed Fuel Consumption (results shown in FIG. 2)

Test compares fuel consumption at steady speeds. It also demonstrates the beneficial effects of the lubricant coating material on fuel consumption.

|  | Test car A | Test car B | Test car C | Test car D |
|---|---|---|---|---|
| Fuel consumption in February, before the test (km/l) | 3.02 | 2.83 | 2.95 | 2.85 |
| Cumulative travel distance (km) | 592,926 | 695,918 | 486,624 | 554,685 |
| Fuel consumption | 3.09 | 2.87 | 3.02 | 2.76 |

-continued

| | Test car A | Test car B | Test car C | Test car D |
|---|---|---|---|---|
| in March after the test (km/l) Cumulative travel | | | | |
| distance (km) | 8,284 | 8,771 | 8,232 | 8,900 |
| Fuel consumed (l) | 2,681 | 3,056 | 2,726 | 3,225 |
| Fuel consumption | 3.19 | 3.08 | 2.90 | 2.93 |
| in May after the test (km/l) Cumulative travel | | | | |
| distance (km) | 23,848 | 25,757 | 26,437 | 25,969 |
| Fuel consumed (l) | 2,719 | 3,124 | 3,007 | 2,848 |
| Fuel consumption | 3.27 | 3.06 | 2.76 | 2.80 |
| in July after the test (km/l) Cumulative travel | | | | |
| distance (km) | 37,530 | 41,329 | 43,401 | 40,299 |
| Fuel consumed (l) | 2,105 | 2,553 | 3,001 | 2,426 |
| Fuel consumption | 3.28 | 3.01 | 2.83 | 2.99 |
| in September after the test (km/l) Cumulative travel | | | | |
| distance (km) | 52,701 | 55,641 | 59,074 | 55,987 |
| Fuel consumed (l) | 2,425 | 2,185 | 2,580 | 2,491 |
| Average fuel consumption (km/l) | 3.21 | 3.01 | 2.87 | 2.87 |
| Total fuel consumed (l) | 16,442 | 18,478 | 20,577 | 19,536 |
| Percentage improvement in fuel consumption | 6.29% | 6.36% | −2.27% | 0.70% |

Evaluation

The fuel consumption of trucks using the engine oil containing the newly developed lubricant coating material did not vary much during the testing period. This suggests that using the coating material regularizes fuel consumption, which would otherwise vary according to season.

h. Effects of Lubricant Coating Material on Machine Parts (Objective) To examine the effects of using the lubricant coating material on machine parts that rub.

(Test 1)

Test machine: Fraise (machine used for precision cutting)
made by Ohkuma, STM3V type Lubricant Capacity: 60 l Method for Adding Lubricant: Added 600 cc of the lubricant coating material to the oil taken out of the oil tank. After turning on the power of the lubricating system so that the oil in the tank is circulated, the oil with the lubricant coating material was returned to the tank.

Measuring Apparatus: Current was measured with a clamp meter SLM-15R manufactured by Sanwa Electronics Instrument Co., Ltd.

Results:

| Current consumed before adding the LCM: | 14 amp |
|---|---|
| Current consumed 2 hours after adding LCM: | 11 amp |
| Rate of change: | 21.42% |

(Test 2)

Test machine: Lathe made by Daiwa, #3

Amount of oil for main shaft: 3.75 l

Method of adding lubricant: Remove the oil cap on the main shaft, add 60 cc of the lubricant coating material while shaft is rotating at 95 rpm. 90 minutes of machine operation at 960 rpm elapsed before measuring the current in order to allow the LCM to be dispersed.

Measuring apparatus: SLM-15R clamp meter manufactured by Sanwa Electronics Instrument Co., Ltd.

Results:

| Rotating speed (rpm) | 1560 | 960 | 610 | 380 | 95 |
|---|---|---|---|---|---|
| Current before addition (A) | 9.0 | 7.5 | 7.0 | 6.75 | 6.5 |
| Current after addition (A) | 7.2 | 6.5 | 6.4 | 6.3 | 6.3 |
| Rate of change (%) | 20.00 | 13.33 | 8.57 | 6.66 | 3.07 |

Temperature of the oil was normal after test (under the ambient temperature 15° C.)

The results of these two tests on machinery demonstrate the effectiveness of the lubricant coating material in reducing friction on machine parts that rub.

SUMMARY

The newly developed lubricant coating material embeds itself in the metal sufaces of rubbing or rotating machine parts. It smooths microscopically rough surfaces and substantially reduces friction. The lubricant coating material offers superior performance in terms of its resistance to solvents, heat, abrasion, pressure, and oxidation. It is not prone to either chemical or physical degradation. The method of manufacturing the lubricant coating material is well developed and its effectiveness is proven.

We claim:

1. A method of forming a friction-reducing lubricant coating layer between at least two metal surfaces which are in a frictional mating relationship with each other comprising the steps of contacting said metal surface with a lubricant coating composition comprising a lubricating oil including from about 1.64 to 11.1 grams per liter of oil of substantially spheroidal ceramic particles which are characterized by a maximum particle diameter of 0.5 microns, a melting point of a least 1800° C. and Vickers hardness in the range from 300 Hv to 1500 Hv, depositing on at least a portion of the mating surface of at least one of said metal surfaces a wear layer comprising said ceramic particles, said particles being substantially permanent to said mating surface.

2. A method according to claim 1 wherein said ceramic particles have an average particle diameter of 0.1 micron.

3. A method according to claim 1 wherein said ceramic particles have a Vickers hardness in the range of from 300 Hv to 850 Hv.

4. A method according to claim 3 wherein said ceramic particles have an average particle diameter of 0.1 micron.

5. A method according to claim 1 wherein said ceramic particles comprise zirconium oxide.

6. A method according to claim 5 wherein said zirconium oxide particles have an average particle diameter of 0.1 micron.

* * * * *

UNITED STATES PATENT AND TRADEMARK OFFICE
CERTIFICATE OF CORRECTION

PATENT NO. : 5,173,202
DATED : December 22, 1992
INVENTOR(S) : Kodo Kawabata et al.

It is certified that error appears in the above-indentified patent and that said Letters Patent is hereby corrected as shown below:

column 4, line 47: "36 1" should be --36 $\ell$--;
column 4, line 66: "(km/1)" should be --(km/$\ell$)--;
column 5, lines 4, 10, 16, 22 and 27: "(km/1)" should be --(km/$\ell$)--;
column 5, lines 7, 13, 19, 25 & 29: "(1)" should be --($\ell$)--;
column 5, line 42: "60 1" should be --60 $\ell$--;
column 5, line 61: "3.75 1" should be --3.75 $\ell$--.

Signed and Sealed this

Twenty-eighth Day of June, 1994

Attest:

BRUCE LEHMAN

*Attesting Officer*  *Commissioner of Patents and Trademarks*